(12) United States Patent
Nair et al.

(10) Patent No.: US 9,213,624 B2
(45) Date of Patent: Dec. 15, 2015

(54) APPLICATION QUALITY PARAMETER MEASUREMENT-BASED DEVELOPMENT

(75) Inventors: Mini Nair, Hyderabad (IN); Pankaj Kachrulal Sarda, Hyderabad (IN); Anand Rengasamy, Hyderabad (IN); Alok Jain, Hyderabad (IN); Srivatsan Kidambi, Hyderabad (IN); Vivek Dalvi, Hyderabad (IN); A.R.K. Vamsee, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 440 days.

(21) Appl. No.: 13/485,820

(22) Filed: May 31, 2012

(65) Prior Publication Data

US 2013/0326467 A1 Dec. 5, 2013

(51) Int. Cl.
*G06F 9/44* (2006.01)
*G06F 11/36* (2006.01)

(52) U.S. Cl.
CPC .................. *G06F 11/3664* (2013.01)

(58) Field of Classification Search
None
See application file for complete search history.

(56) References Cited

U.S. PATENT DOCUMENTS

| | | | |
|---|---|---|---|
| 7,028,225 B2 | 4/2006 | Maso et al. | |
| 7,099,938 B2* | 8/2006 | Hermann et al. | 709/224 |
| 7,254,517 B2 | 8/2007 | Elbel et al. | |
| 7,596,778 B2 | 9/2009 | Kolawa et al. | |
| 8,285,841 B2* | 10/2012 | Oostlander et al. | 709/224 |
| 8,522,193 B2* | 8/2013 | Barness et al. | 717/100 |
| 2004/0191743 A1 | 9/2004 | Chiu et al. | |
| 2005/0071807 A1 | 3/2005 | Yanavi | |
| 2007/0074148 A1* | 3/2007 | Morgan | 717/101 |
| 2012/0198368 A1* | 8/2012 | Bornheimer et al. | 715/763 |

OTHER PUBLICATIONS

Ionita, et al., "Scenario-Based Software Architecture Evaluation Methods: An Overview", Retrieved at <<http://www.win.tue.nl/~eeskenaz/papers/Scenario-Based%20SWA%20Evaluation%20Methods.pdf>> Proceedings: In Workshop on Methods and Techniques for Software Architecture Review and Assessment at the International Conference on Software Engineering, May 19, 2002, pp. 1-12.

(Continued)

*Primary Examiner* — Van Nguyen
*Assistant Examiner* — Melissa Alfred
(74) *Attorney, Agent, or Firm* — Ben Tabor; Kate Drakos; Micky Minhas

(57) ABSTRACT

A development environment provides warnings based on one or more application categories set for an application. Each warning has a trigger threshold and a warning action. Different application categories have different warnings. The development environment proactively tests for trigger conditions and provides triggered warnings within a workflow that includes application designing, code editing, building, and running. For instance, a Social Networking application whose start-up time is greater than desired for Social Networking applications will trigger a warning. Password Manager or Finance applications that should use a more secure approach to store user data will trigger a warning not given to applications in other categories. A News application may trigger a warning from the development environment that application content is not easily readable if a user switches to a light color theme on a device. The application category is selected by the developer or set proactively by the development environment.

20 Claims, 3 Drawing Sheets

(56) References Cited

OTHER PUBLICATIONS

Folmer, et al., "Scenario-based Assessment of Software Architecture Usability", Retrieved at <<http://cserg0.site.uottawa.ca/ucm/pub/UCM/VirLibEHCI2006/ehci2003.pdf>> Proceedings: Workshop on Bridging the Gaps between Software Engineering and Human-Computer Interaction, ICSE, Portland, May 3, 2003, pp. 61-68.

Nagappan, et al., "Towards a Metric Suite for Early Software Reliability Assessment", Retrieved at <<http://www.chillarege.com/fastabstracts/issre2003/177-FA-2003.pdf>> Proceedings: International Symposium on Software Reliability Engineering, Proceedings: International Symposium on Software Reliability Engineering, Nov. 17, 2003, pp. 238-239.

Andy Roberts, "Apple redefines iOS project types in XCode 4", Retrieved at <<http://andylroberts.com/2011/apple-redefines-ios-project-types-in-xcode-4/>>, Jul. 13, 2011, Pages.

iTunes App Store menu, Mar. 29, 2012, 1 Page.

"List of apps optimized for thenew iPad and its RetinaDisplay", Retrieved at <<http://gadgetmania.com/2012/03/list-of-apps-optimized-for-the-new-ipad-and-its-retina-display/>>, Mar. 29, 2012, 3 Pages.

* cited by examiner

APPLICATION QUALITY PARAMETER MEASUREMENT-BASED DEVELOPMENT

BACKGROUND

Computer software can be classified based on characteristics such as functionality and field of use. In some classifications, "application software" includes computer programs which interact directly with people to perform tasks at their direction. Application software may be general-purpose software intended for various fields of use. For instance, word processors and web browsers are used in many professions and industries. Application software may also have a specific field of use, such as legal docketing, accounting, package tracking, and so on.

Unlike application software, "system software" interacts primarily with other software to perform tasks that support application software. For instance, device drivers, kernels, network protocols, process schedulers, memory managers, and many other kinds of system software are used in computer systems and networks. Computer programming "tools" such as compilers, debuggers, profilers, and others are used to edit, generate, translate, combine, debug, profile, test, and/or otherwise assist in software development.

However, such classifications generally have limitations, in part because some software fits in more than one of these classifications. For example, a source code editor may be viewed both as an application and as a development tool. Moreover, many different classifications of software are possible, classifications are often vague, and the choice between classifications is often subjective and fluid. As a result, suitable classifications have not been as well-identified, nor as closely and deeply integrated into software development, as they could be.

SUMMARY

An application may be excellent in some respects and lacking in others, yet be given a single overall rating that does not reflect these differences. Someone interested in the application may learn about the differences only after reading a textual review. But some embodiments described herein provide a software development process involving multiple individual quality parameter ratings for an application, based on detailed technical criteria, and the publication of those individual ratings in an application marketplace.

Some embodiments configure a hardware memory of a computing environment with an application, such as a portable device application. The memory is in operable communication with a development environment which includes executable quality measurement code. The development environment obtains the application, and the developer submits a request for the application to undergo quality measurement by the quality measurement code.

In some embodiments, the development environment simulates conditions which combine device states, events, hardware configurations, and usage scenarios, and applies specific rating criteria, to arrive at the ratings. That is, the individual quality parameter ratings for the specific application are based at least in part on simulated conditions. The quality measurement code displays rating criteria, and indicates improvements that will provide higher ratings. The developer receives the individual quality ratings provided for the application. In some embodiments, ratings are provided for two or more of the following individual quality parameters: user experience, cost awareness, battery friendliness, responsiveness, global readiness, device independence, application stability. The developer may then publish some or all of the ratings in an application marketplace, as part of an offering of the application.

In some embodiments, an individual quality parameter rating varies according to an application category selected for the application. That is, different ratings could be given for the very same application code if the category was changed, because some rating criteria are category-specific. For example, security is rated differently for a Finance application than a Music application, and startup time is rated differently for a Social Networking application than for a Games application. The developer selects an application category for the application, from a list of application categories displayed by the development environment. In some embodiments, the list of application categories includes two or more of the following: Books, Business, Catalogs, Education, Email, Entertainment, Finance, Games, Health & Fitness, Lifestyle, Medical, Music, Navigation/Search, News, Password Manager, Photo & Video, Productivity, Reference, Social Networking, Sports, Travel, Utilities, Weather. In a variation, the development environment selects the application category, based on the application name, the application program interface(s) used, libraries used, and/or other heuristics.

In some embodiments, a user experience rating is based on at least one of the following criteria: adherence to published user interface guidelines, text readability, localization readiness, multiple hardware variants readiness, input friendliness. In some, a cost awareness rating is based at least in part on network usage. In some, a battery friendliness rating is based on at least one of the following criteria: whether the battery lasts at least a predetermined length of time in a specified usage scenario, whether unused peripherals are powered, whether application program interfaces designated as power-hungry are avoided, whether darker color themes can be chosen over lighter colors, whether batching is used for network data communications, whether code execution algorithms are optimized, whether disk access (file i/o) operations are optimized.

In some embodiments, a responsiveness rating is based on at least one of the following criteria: start-up speed, resume speed, response time during game play, response time when an incoming text or phone call arrives, smoothness of streamed video, smoothness of music play, response to any user input. In some, a global readiness rating is based on at least one of the following criteria: responsiveness in a low-bandwidth network, usability of the application in low-cost devices, readiness of the application for specified locales. In some, a device independence rating is based on at least one of the following criteria: functionality with different central processing units; functionality with different amounts of memory; functionality with different graphical processing units; display resolutions, at least two of the following peripherals: gyro, camera, compass, accelerometer, global positioning system, proximity, light.

In some embodiments, an application stability rating is based on at least one of the following criteria: whether the application terminates gracefully; any unhandled exceptions during execution; adherence to platform application model artifacts; readiness to handle at least two of the following interruptions: incoming phone calls, reminder pop-ups, alarms, notifications. In some, ratings are collectively based on two or more of the following simulated conditions: different device central processor units; different device graphical processor units; different device memory capacities; different device peripherals; telecommunications network connection dropping; global positioning system connection dropping; connection to 2G, 3G, 4G/LTE, and/or Wi-Fi networks; interruption by incoming phone call; interruption by incoming SMS; network latency; usage outdoors; network roaming; landscape/portrait mode changes; switching between applications; power off/on; different display resolutions.

An application may also be excellent in some respects and lacking in others, depending on which aspects of the application are exercised and the conditions in which the application is exercised. A developer may learn about some differences only after releasing the application to users and receiving feedback from them. However, some embodiments described herein provide a software development process with multiple individual quality tests for an application that are based on detailed technical criteria, and provide specific warnings during development before the application is released to users.

In using some embodiments, a developer learns from a screen display, user manual, or other indication that a development environment will provide different warnings during development of the application. The warnings are based on which application category the application is in, and on automatically obtained information about the application, such as which application program interfaces are used, and simulation results.

Thus notified, the developer creates a development project for the application in the development environment, and ratifies an application category selection for the application. The application category is either selected by the developer from a list of application categories displayed by the development environment, or set proactively by the development environment in response to the application's name, a library that the application includes, and/or an application program interface that the application uses, for example. Some of the suitable application categories include Books, Business, Catalogs, Education, Email, Entertainment, Finance, Games, Health & Fitness, Lifestyle, Medical, Music, Navigation/Search, News, Password Manager, Photo & Video, Productivity, Reference, Social Networking, Sports, Travel, Utilities, Weather.

In some embodiments, the application category is Social Networking, and the developer receives a warning from the development environment that the application has a start-up time greater than desired for Social Networking applications. In some, the application category is Password Manager or Finance, and the developer receives a warning that the application should use a more secure approach to store user data than the approach being used in the project. In some, the application category is News or Photo & Video, and the developer receives a warning that the application should request several photos at a time instead of requesting them one at a time with delays in between the requests.

In some embodiments, the application category is Email, Photo & Video, News, or Social Networking and the developer receives at least one of the following warnings from the development environment about choosing an image resolution: the application should try to detect what kind of network is available, the application should try to detect what video resolutions are available, the application should consider the network bandwidth, the application should consider the user's data plan costs. In some, the application category is Photo & Video and the developer receives a warning that the application should detect whether a camera is available on the device running the application.

In some embodiments, the application category is Navigation/Search and the developer receives a warning from the development environment that the application should use power efficient APIs to resolve location. In some, the application category is Weather and the developer receives a warning that the application should take care of width and/or height of controls to accommodate content in various locales.

In some, the application category is News and the developer receives a warning that the application should ensure that all controls meet minimum dimension requirements stated in user interface guidelines.

In some embodiments, the application category is News and the developer receives a warning from the development environment that the application content is not easily readable when a user switches to a light theme setting on the device. In some, the application category is Games and the developer receives a warning that the application should adhere to platform application model guidelines for back-key handling and/or exception handling.

In some embodiments, the development environment assigns a set of warnings based on one or more application categories set for the application. Each warning has a trigger threshold and a warning action. Different application categories have different warnings, namely, they have different trigger thresholds for the same warning action and/or different warning actions. Some embodiments proactively test for trigger conditions and proactively provide triggered warnings within a workflow that includes application code editing, application building, and application running.

For example, in some embodiments a Social Networking category warning and a Games category warning each have an action to warn a developer that an application's startup time should be shorter than a trigger threshold, and the Social Networking category warning has a smaller trigger threshold than the Games category warning. In some, an Entertainment category warning and a Finance category warning each have an action to warn a developer that an application should use at least a trigger threshold level of security to store user data, and the Finance category warning has a more secure trigger threshold than the Entertainment category warning. In some, a Password Manager category warning has an action to warn a developer that an application should use at least a trigger threshold level of security to store user data, and at least one other application category warning has the same warning action but a less secure trigger threshold.

In some embodiments, a Finance category warning has an action to warn a developer that an application should use at least a trigger threshold level of security to store user data, and at least one other application category warning has the same warning action but a less secure trigger threshold. In some, a News category warning has an action to warn a developer that an application should request at least a trigger threshold number of photos at a time instead of requesting them less than that number at a time. In some, a Photo & Video category warning has an action to warn a developer that an application should request at least a trigger threshold number of photos at a time instead of requesting them less than that number at a time.

In some embodiments, a Navigation/Search category warning has an action to warn a developer that an application should use power efficient APIs to resolve location, and the trigger threshold is an estimated power consumption. In some, a Weather category warning has an action to warn a developer that an application should accommodate content in various locales, and the trigger threshold is a user interface control dimension. In some, a News category warning has an action to warn a developer that an application should accommodate content in various locales, and the trigger threshold is a minimum dimension stated in a user interface guideline.

In some embodiments, the application is a mobile platform application, and the embodiment provides a warning that the application will use a color combination that is difficult to read in daylight or in a light theme. The embodiment additionally or alternatively provides a warning that the application will use a control layout that does not pass the "fat finger test" and/or otherwise fails to meet touch area requirements.

In some embodiments, the application is a networked application, and the process provides one or more of the following warnings: the application is not using bandwidth-aware APIs and should use those APIs; the application could be better at handling network connection dropping; the application could be better at choosing connections different types of networks; the application could be better at handling network latency; the application could be better at usage outdoors; the application could be better at network roaming; the application could be better at cost awareness to avoid bill shock to end-users.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
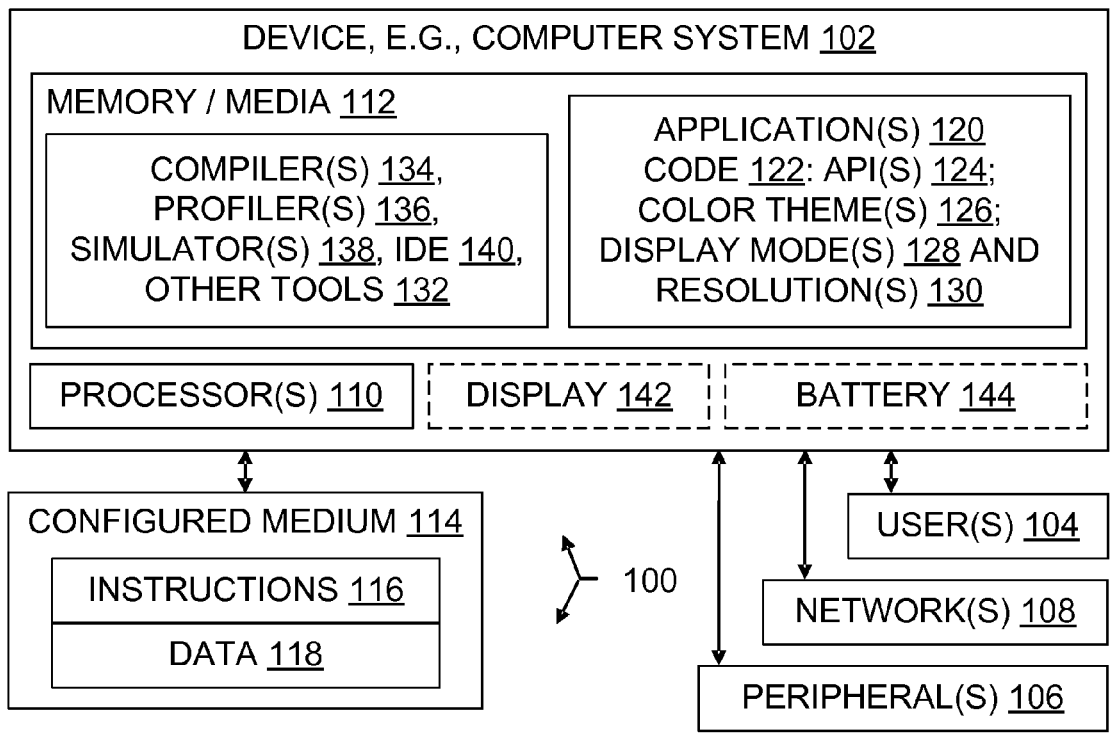
FIG. 1 is a block diagram illustrating a computer system having at least one processor, at least one memory, one or more applications under development, and other items in an operating environment which may be present on multiple network nodes, and also illustrating configured storage medium embodiments.

In mobile devices such as mobile phones and tablets, applications are subjected to many different conditions, more than they were in desktop environments. Many factors affect applications, such as the variety of hardware, power and battery constraints, reliability and speed of network connectivity, memory capacity, and others. Usage patterns of these applications present questions of how the application behaves in a network congested environment, in power constrained scenarios, with a low memory device, when interruption occurs because of a phone call or SMS (short messaging system, e.g., text message), and other variables.

Developers often lack adequate tools to measure and analyze such variables before application release, to confirm that their applications will behave as intended in varying real life scenarios. Developers may depend heavily on user feedback, which occurs after users purchase the app, and which can result in bad ratings for their apps. Too often, a development tool experience is fragmented across silos of coding-related tasks, and does not adequately help developers make their applications ready for real life.

Many application marketplaces use a one-dimensional star-based rating system to quantify an application's quality, that is, a rating that corresponds to one value in a single range of values. Many rating systems take the end user feedback as the only primary input, with little or no objective or measurable basis for the rating, except an average of individual user ratings. Although end user feedback should be respected, it is not necessarily the only suitable input to application ratings. Star ratings provide end users with extremely limited information about application qualities when all the different aspects of applications are boiled down to the number of stars awarded, and when there is no consistent way of relating stars to actual characteristics of applications.

Such star ratings also fail to help developers determine how to improve their applications. In short, there are challenges with respect to applications' readiness for real life scenarios, such as how to provide more objective and concrete ways to measure an application quality, how to provide tools to help developers achieve higher ratings on this objective scale, and how to help developers distinguish their applications from other applications in a marketplace according to these ratings.

Some embodiments described here express the quality of applications in terms of measurable and objective factors. These embodiments do not necessarily replace the end user rating system, and they can augment and enhance that rating system.

Some embodiments facilitate or include a unified set of tools that provide developers a way to measure the quality of an application objectively under real life scenarios and also help them get their applications distinguished from other applications in a marketplace. Runtime performance becomes one of multiple measured factors. Developers can use the tools in a unified manner, e.g., within a single workflow, to perform operations such as measuring the quality of an application objectively according to specified rating criteria organized within a few quality parameters, simulating real life scenarios in a lab environment, recording and playing back such simulations and quality measurements, and publishing objective quality ratings in a marketplace.

Unified tools and processes give the developer increased ability to build an application and validate it in the context of real life conditions. When these tools are used together instead of in isolation, the developer is better able to understand particular aspects of the application's readiness for real life. For example, a developer or a development environment can measure the quality of an application while simulating real life conditions and recording the scenario to repeat verifications later.

The quality of the application can be measured at each phase of the development lifecycle to inform the developer about potential improvements in a timely way. The developer need not wait till the last moment to address the quality issues, but instead gets appropriate warnings which can be acted on at the time. App quality can be maintained and improved from day one throughout development until the application is ready for release, without requiring the developer to explicitly enter a different workflow to validate app quality and performance. For example, at design time a developer is warned if the application does not meet the UI guidelines, and at build time the developer is warned if the application does not use an available more efficient API, and at runtime warnings are given based on performance, such as excessive startup time.

By summarizing the readiness of an application for real life through a multi-parameter objective rating mechanism, an application can be more accurately compared with similar applications and/or with other applications from the same marketplace category. The ratings can be made available to prospective purchasers in the marketplace, so they are better informed without being forced to read numerous text reviews.

Many of the tools and processes described herein can be used for any application (mobile, web, desktop, etc.), but particular embodiments are directed at development and quality measurement of applications for mobile phones (e.g., smartphones) and tablets.

Some embodiments described herein may be viewed in a broader context. For instance, concepts such as categories, warnings, ratings, triggers, responsiveness, stability, device independence, and power usage may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving categories, warnings, ratings, triggers, responsiveness, stability, device independence, and/or power usage are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Those of skill will understand which meaning is intended in a particular instance, and will also understand that a given claimed process (in the patent law sense) may be implemented using one or more processes (in the computing science sense).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise beyond the scope of human performance alone. "Computational steps" are steps performed computationally. Neither "automatically" nor "computationally" necessarily means "immediately".

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "parameter(s)" means "one or more parameters" or equivalently "at least one parameter".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accepting, assigning, basing, building, categorizing, configuring, considering, creating, detecting, developing, displaying, indicating, learning, listing, measuring, performing, producing, providing, publishing, ratifying, rating, reading, receiving, recording, selecting, setting, simulating, specifying, submitting, testing, warning (and accepts, accepted, assigns, assigned, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a transitory signal on a wire, for example. No claim covers a signal per se.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, rgb camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

As another example, a game application may be resident on a Microsoft XBOX Live® server (mark of Microsoft Corporation) and/or other device. More generally, a game application may be purchased from a console and it may be executed in whole or in part on the server, on the console device, or both. Multiple users may interact with the game using standard controller peripherals, air gestures, voice, and/or using a companion device such as a smartphone or a tablet. Some operating environments 100 include devices and infrastructure which support game application use scenarios discussed herein.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, and/or optical media, as opposed to media that merely propagates a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other memory storage devices which are not readily removable by users 104. Neither a computer-readable medium nor a computer-readable memory includes a signal per se.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic. Alternatively, or in addition to software implementation, the functionally described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components.

In the illustrated environments 100, one or more applications 120 have code 122, which may include application program interfaces (APIs) 124, code implementing color themes 126, code implementing display 142 modes 128 and/or code implementing display 142 resolutions 130, for example. Software development tools 132 such as compilers 134, profilers 136, simulators 138, and/or an integrated development environment (IDE) 140, assist with software development by producing and/or transforming code 122. The code 122, tools 132, and other items shown in the Figures and/or discussed in the text, may each reside partially or entirely within one or more hardware media 112, thereby configuring those media. In addition to processors 110 (CPUs, ALUs, FPUs, and/or GPUs), memory/storage media 112, display(s) 142, and battery(ies) 144, an operating environment may also include other hardware, such as buses, power supplies, wired and wireless network interface cards, and accelerators, for instance. CPUs are central processing units, ALUs are arithmetic and logic units, FPUs are floating point processing units, and GPUs are graphical processing units.

A given operating environment 100 may include an Integrated Development Environment (IDE) 140 which provides a developer with a set of coordinated software development tools 132 such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
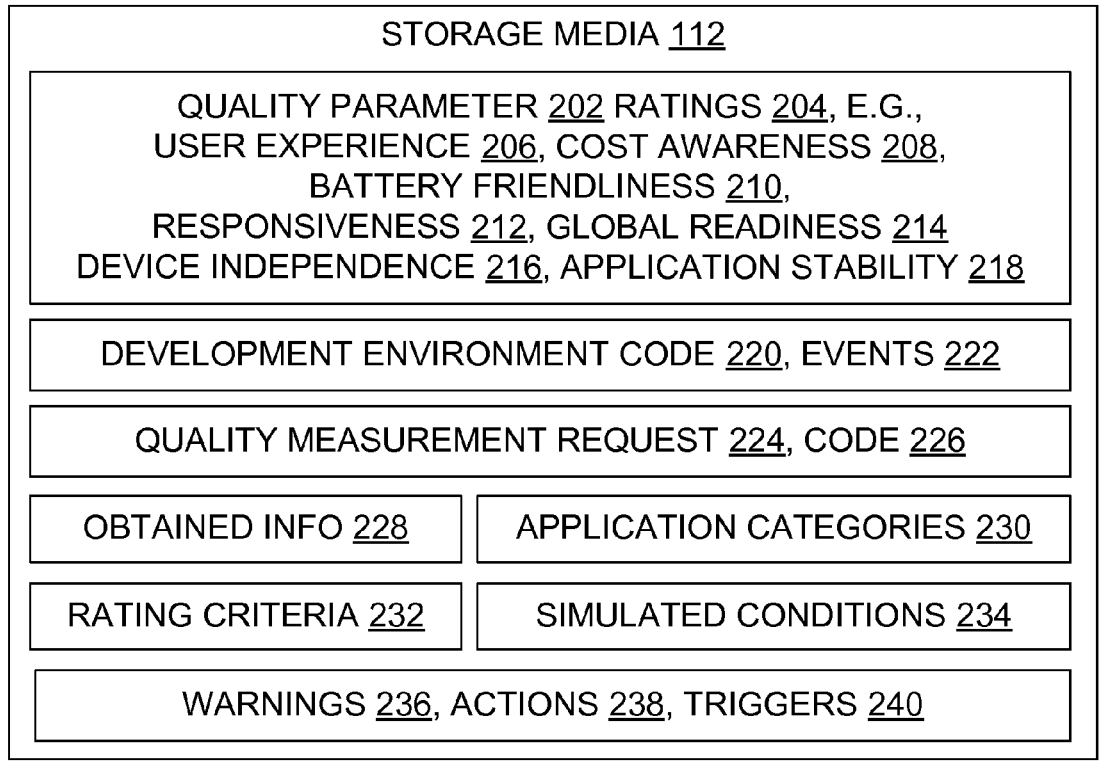
FIG. 2 is a block diagram illustrating aspects of application quality parameter measurement in an example architecture.

FIG. 2 illustrates an architecture which is suitable for use with some embodiments. Individual quality parameters 202 are measured, yielding ratings 204. The quality parameters that are determined and/or tracked in a given embodiment may include, for example, user experience 206, cost awareness 208, battery friendliness 210, responsiveness 212, global readiness 214, device independence 216, and/or application stability 218. One or more of the quality parameters 202 may appear in a given embodiment under a different but similar name, e.g., "battery conservation," "battery life," "power consumption," or "power usage" instead of "battery friendliness." Those of skill will recognize parameters 202 by whatever name, as implemented in terms of various rating criteria 232 discussed herein. A given quality parameter 202 may also be rolled into another parameter in limited ways, namely, one or more rating criteria 232 for cost awareness 208, responsiveness 212, global readiness 214 and/or application stability 218 may be a basis instead for user experience 206 measurement in some embodiments.

Some embodiments include development environment code 220 (also referred to herein as development environment 220), which may be part of an integrated development environment 140 or distinct from such an IDE 140. In some embodiments, development environment code 220 simulates conditions 234 which combine device states, device-user interaction events 222, internal device events 222, other monitored events 222, hardware configurations, and usage scenarios, and then provides a developer with individual quality parameter ratings 204 for a specific application 120 based at least in part on the simulated conditions 234.

Specifically, in some embodiments the ratings 204 are computed by quality measurement code 226 in response to implicit or explicit requests 224 from the developer 104. Ratings 204 and warnings 236 of application shortcomings are computed by code 226, 220 on the basis of factors that typically include rating criteria 232, the particular application category(ies) 230 associated with the application 120, and automatically obtained information 228. The information 228 includes, for example, which APIs are used (or not used), timing measurements during execution, user interactions and other events, application settings, and other information. Warnings 236 include triggers 240 and resulting triggered actions 238, e.g., warning messages (which may be phrased as warnings, suggestions, or mere observations about the application's implementation or behavior).

Figure 3:
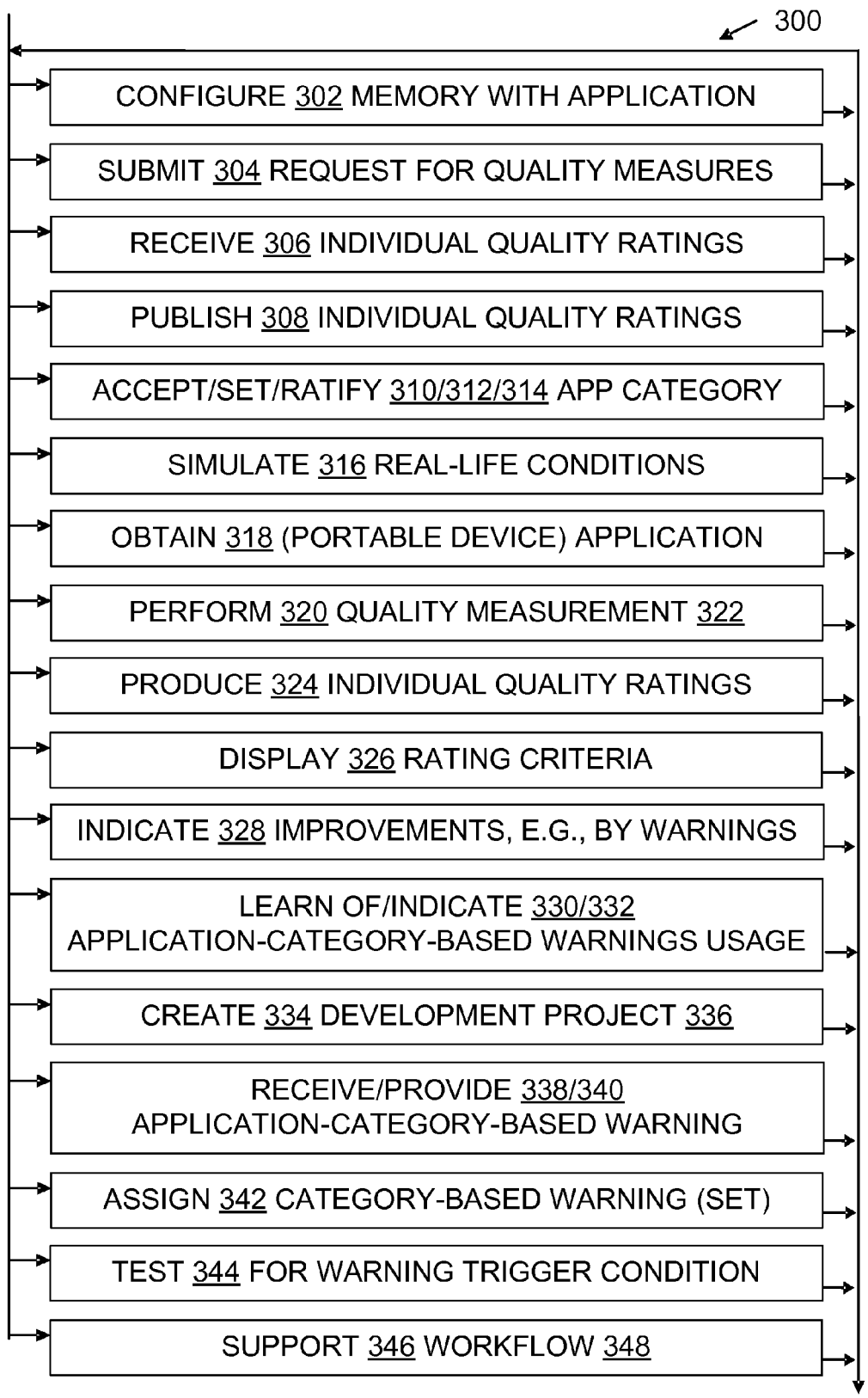
FIG. 3 is a flow chart illustrating steps of some process and configured storage medium embodiments.
Figure 4:
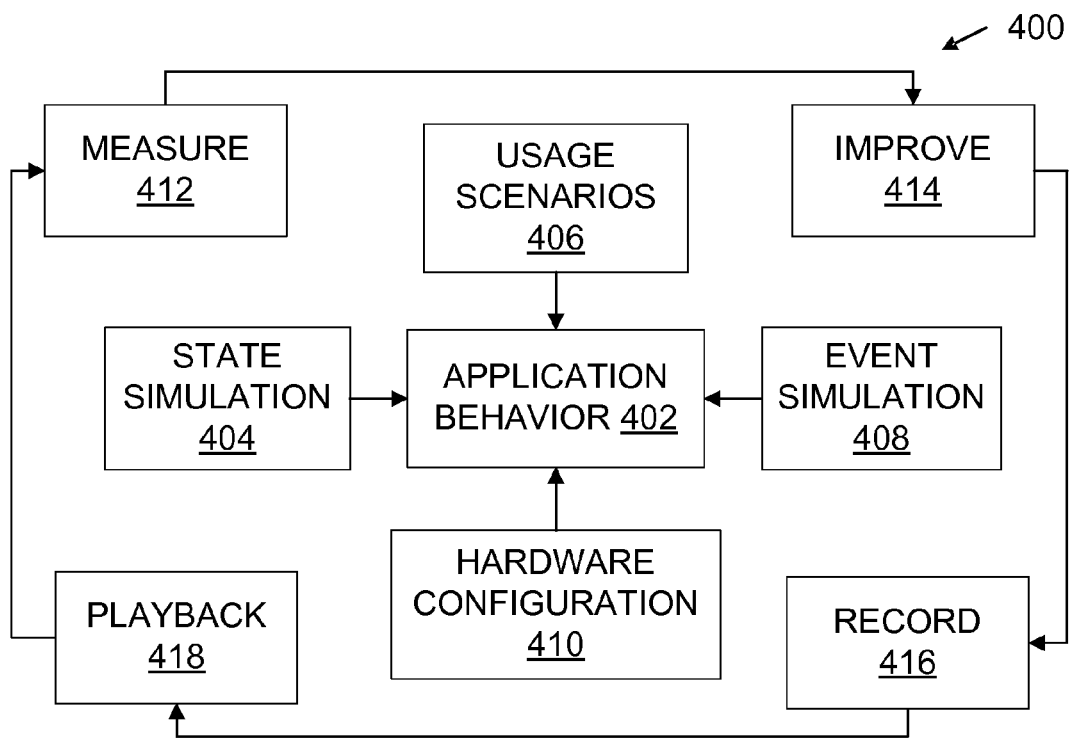
FIG. 4 is a data flow diagram illustrating aspects of a development environment and an application marketplace.

With reference to FIGS. 1 through 3, some embodiments provide a computer system 102 with a logical processor 110 and a memory medium 112 configured by circuitry, firmware, and/or software to transform an application 120 into specific suggestions for application improvement by extending development functionality with individual application quality parameter measurements as described herein.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, application code 122 and compilers 134 may be on multiple devices/systems 102 in a networked cloud, simulators 138 may be run on yet other devices within the cloud, and the quality measurement code 226 may configure the display(s) 142 on yet other cloud device(s)/system(s) 102.

Processes

FIG. 3 and illustrates some process embodiments in a flowchart 300 and/or a data flow diagram 400. Processes shown in the Figures may be performed in some embodiments automatically, e.g., by quality measurement code 226 driven by proactive requests 224 from IDE 140 code or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

Some embodiments described herein provide a software development process involving multiple individual quality parameter 202 ratings 204 for an application 120, based on detailed technical criteria 232, and support the publication 308 of those individual ratings in an application marketplace 424.

For example, some embodiments configure 302 a hardware memory 112 of a computing environment 100 with an application 120, such as a portable device application. The memory is in operable communication with a development environment 220 which includes executable quality measurement code 226. The development environment obtains 318 the application, via project name, file name(s), memory point(s), and/or other mechanisms. The developer 104 submits 304 a request 224 for the application to undergo quality measurement 322 performed 320 by the quality measurement code 226.

In some embodiments, the request 224 may be a standing request, such that some or all quality parameters 202 are measured by default, or the request 224 may be particularized in that it turns on measurement 412 of some or all specified quality parameters 202. Particularized requests 224 may be entered through a graphical user interface, a command line, an API, or another interface mechanism.

In some embodiments, the quality measurement may be performed 320 by checking the APIs used, simulating application behavior 402 in view of components 422 such as design choices and hardware configurations 410, and testing 344 for specified warning triggers 240 as described herein.

In some embodiments, the development environment 220 simulates 316 conditions 234 which combine device states 404, simulated events 408, 222, hardware configurations 410, and usage scenarios 406, and applies specific rating criteria 232, to arrive at the ratings 204. That is, in some embodiments the individual quality parameter ratings 204 for the specific application 120 are based at least in part on simulated conditions 234. In some, the quality measurement code 226 displays 326 rating criteria, and indicates 328 through warnings or other messages specific improvements that will provide higher ratings 204.

The developer 104 receives 306 the individual quality ratings thus provided for the application 120. In some embodiments, ratings 204 are provided 324 for two or more of the following individual quality parameters 202: user experience 206, cost awareness 208, battery friendliness 210, responsiveness 212, global readiness 214, device independence 216, application stability 218. The developer 104 may then publish 308 some or all of the ratings in an application marketplace 424, as part of an offering 426 of the application 120.

In some embodiments, an individual quality parameter rating 204 varies according to an application category 230 selected 310/312/314 for the application. That is, different rating values could be given for the very same application code 122 if the category 230 associated with that code 122 was changed, because some rating criteria 232 are category-specific. For example, security is rated differently for a Finance category application than a Music category application, and startup time is rated differently for a Social Networking category application than for a Games category application. In some embodiments, the developer selects 312, 314 an application category 230 for the application, from a list of application categories displayed by the development environment. In some, the development environment code 220 proposes a category, which is then ratified 314 by the developer's explicit or implicit acceptance 310 of the category choice. For instance, the development environment may select an application category based on the application name, the application program interface(s) used, libraries used, and/or other heuristics.

In some embodiments, the list of application categories 230 includes two or more of the following categories: Books, Business, Catalogs, Education, Email, Entertainment, Finance, Games, Health & Fitness, Lifestyle, Medical, Music, Navigation/Search, News, Password Manager, Photo & Video, Productivity, Reference, Social Networking, Sports, Travel, Utilities, Weather.

In some embodiments, a user experience 206 rating 204 is based on at least one of the following criteria 232: adherence to published user interface guidelines, text readability, localization readiness, multiple hardware variants readiness (a.k.a. "device independence"), input friendliness.

In some embodiments, a cost awareness 208 rating 204 is based at least in part on network usage as a criterion 232.

In some embodiments, a battery friendliness 210 rating 204 is based on at least one of the following criteria 232: whether the battery 144 lasts at least a predetermined length of time in a specified usage scenario 406, whether unused peripherals 106 are powered, whether application program interfaces 124 designated as power-hungry are avoided, whether darker color themes 126 can be chosen over lighter colors, whether batching is used for network 108 data communications, whether code 122 execution algorithms are optimized in known ways.

In some embodiments, a responsiveness 212 rating 204 is based on at least one of the following criteria 232: application start-up speed, resume speed, response time during game play, response time when an incoming text or phone call arrives, smoothness of streamed video, smoothness of music play, response to any user input.

In some embodiments, a global readiness 214 rating 204 is based on at least one of the following criteria 232: responsiveness in a low-bandwidth network 108, usability of the application 120 in low-cost devices 102, readiness of the application for specified locales.

In some embodiments, a device independence 216 rating 204 is based on at least one of the following criteria 232 related to variant hardware configurations 410: functionality with different central processing units 110; functionality with different amounts of memory 112; functionality with different graphical processing units 110; display 142 resolutions, at least two of the following peripherals 106: gyro, camera, compass, accelerometer, global positioning system, proximity, light.

In some embodiments, an application stability 218 rating 204 is based on at least one of the following criteria 232: whether the application 120 terminates gracefully; any unhandled exceptions during application execution; adherence to platform application model artifacts; readiness to handle at least two of the following interruptions: incoming phone calls, reminder pop-ups, alarms, any notifications.

In some embodiments, ratings 204 are collectively based on two or more of the following simulated conditions 234: different device central processor units 110; different device graphical processor units 110; different device memory 112 capacities; different device peripherals 106; telecommunications network 108 connection dropping; global positioning system network 108 connection dropping; connection to 2G, 3G, 4G/LTE, and/or Wi-Fi networks 108; interruption by an incoming phone call; interruption by incoming SMS (text message); network 108 latency; usage outdoors; network 108 roaming; landscape/portrait mode changes; switching between applications; power off/on; different display resolutions 130.

Some embodiments described herein provide a software development process with multiple individual quality tests 344 for an application 120. The tests 344 that are based on detailed technical criteria 232, and the embodiments provide 340 specific warnings 236 during development, before the application 120 is released to users.

In using some embodiments, a developer 104 learns 330 from a screen display 142, user manual, or other indication 332 that a development environment 220 will provide different warnings 236 during development of the application 120. The warnings are based on which application category 230 the application is in, and on automatically obtained information 228 about the application, such as which application program interfaces 124 are used and application behavior 402 simulation results obtained with monitoring and analysis tools 420.

Thus notified, the developer creates 334 a development project 336 for the application in the development environment 220, and ratifies 314 an application category 230 selection for the application. Ratification 314 is accomplished either by the developer selecting the category or by the developer accepting (using) a category set automatically by the development environment.

In some embodiments, the application category 230 is Social Networking, and the developer 104 receives 338 a warning 236 from the development environment 220 that the application 120 has a start-up time greater than desired for Social Networking applications. More generally, start-up time and/or other thresholds will vary based on the category 230. As another example, a start-up time threshold could be high for a game when compared to a simple productivity app like a calculator. In some embodiments, some warnings or application rating parameters are applicable for a given category, whereas in other embodiments this is not the case.

In some embodiments, the application category 230 is Password Manager or Finance, and the developer receives 338 a warning 236 that the application should use a more secure approach to store user data than the approach being used in the project 336.

In some embodiments, the application category 230 is News or Photo & Video, and the developer receives 338 a warning 236 that the application should request several photos at a time instead of requesting them one at a time with delays in between the requests.

In some embodiments, the application category 230 is Email, Photo & Video, News, or Social Networking and the developer receives 338 at least one of the following warnings 236 from the development environment about choosing an image resolution 130: the application should try to detect what kind of network 108 is available, the application should try to detect what video resolutions are available, the application should consider the network 108 bandwidth, the application should consider the user's data plan costs.

In some embodiments, the application category 230 is Photo & Video and the developer receives 338 a warning 236 that the application should detect whether a camera is available on the device running the application.

In some embodiments, the application category 230 is Navigation/Search and the developer receives 338 a warning 236 from the development environment that the application should use power efficient APIs 124 to resolve location.

In some embodiments, the application category 230 is Weather and the developer receives 338 a warning 236 that the application should take care of width and/or height of user interface controls to accommodate content in various locales.

In some embodiments, the application category 230 is News and the developer receives 338 a warning 236 that the application should ensure that all user interface controls meet minimum dimension requirements stated in user interface guidelines.

In some embodiments, the application category 230 is News and the developer receives 338 a warning 236 from the development environment that the application content is not easily readable when a user switches to a light theme 126 setting on the device.

In some embodiments, the application category 230 is Games and the developer receives 338 a warning 236 that the application should adhere to platform application model guidelines for back-key handling and/or exception handling.

In some embodiments, the development environment 220 assigns 342 a set of warnings 236 based on one or more application categories 230 set for the application 120. Each warning 236 has a trigger threshold (a.k.a., trigger condition or trigger 240), and a warning action 238. Different application categories may have different warnings. That is, they can have different trigger thresholds 240 for the same warning action 238 and/or have different warning actions 238. Some embodiments proactively test 344 for trigger conditions 240 and proactively provide 340, 328 triggered warnings 236 within a workflow 348 that supports 346 application designing, application code editing, application building, and/or application running, for example. Providing 340 warnings and displaying 326 rating criteria are examples of indicating 328 ways to improve an application. The rating criteria 232 may be used in defining triggers 240. However, a given embodiment may include ratings 204, warnings 236, or both. In some embodiments, application designing is free of manual code editing, e.g., a designer may drag-and-drop a control button representation from a toolbox onto a designer surface. Then a warning can be given if the button size does not meet that embodiment's touch requirements. The developer has not manually edited or added code; the step is visual designing rather than code editing in nature.

For example, in some embodiments a Social Networking category 230 warning 236 and a Games category 230 warning 236 each have an action 238 to warn 340 a developer that an application's startup time should be shorter than a trigger threshold 240, and the Social Networking category warning has a smaller trigger threshold than the Games category warning.

In some embodiments, an Entertainment category warning 236 and a Finance category warning 236 each have an action 238 to warn a developer that an application should use at least a trigger threshold level of security to store user data, and the Finance category warning has a more secure trigger threshold 240 than the Entertainment category 230 warning.

In some embodiments, a Password Manager category 230 warning has an action 238 to warn a developer 104 that an application 120 should use at least a trigger threshold level of security to store user data, and at least one other application category 230 warning has the same warning action 238 but a less secure trigger threshold 240.

In some embodiments, a Finance category warning 236 has an action to warn a developer that an application should use at least a trigger threshold 240 level of security to store user data, and at least one other application category 230 warning has the same warning action but a less secure trigger threshold.

In some embodiments, a News category warning 236 has an action to warn 340 a developer that an application should request at least a trigger threshold 240 number of photos at a time instead of requesting them less than that number at a time.

In some embodiments, a Photo & Video category 230 warning has an action to warn a developer that an application should request at least a trigger threshold number of photos at a time instead of requesting them less than that number at a time.

In some embodiments, a Navigation/Search category warning has an action 238 to warn a developer that an application should use power efficient APIs 124 to resolve location, and the trigger threshold 240 is an estimated power consumption.

In some embodiments, a Weather category 230 warning 236 has an action 238 to warn 340 a developer that an application should accommodate content in various locales, and the trigger threshold is a user interface control dimension.

In some embodiments, a News category 230 warning 236 has an action to warn a developer that an application should accommodate content in various locales, and the trigger threshold is a minimum dimension stated in a user interface guideline.

In some embodiments, the application 120 is a mobile platform application, and the embodiment provides 340 a warning that the application will use a color combination that is difficult to read in daylight or in a light theme. The embodiment additionally or alternatively provides 340 a warning 236 that the application will use a control layout that does not meet touch area requirements.

In some embodiments, the application is a networked application, and the process provides 340 one or more of these warnings 236: the application is not using bandwidth-aware APIs and should use those APIs 124; the application could be better at handling network connection dropping; the application could be better at choosing connections different types of networks; the application could be better at handling network latency; the application could be better at usage outdoors; the application could be better at network roaming; the application could be better at cost awareness to avoid bill shock to end-users (e.g., for an email client, streaming video player, streaming audio player, app that supports viewing web pages, social media posts with photos uploaded).

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media as opposed to propagated signal media. The storage medium which is configured may be in particular a removable storage medium 114 such as a CD, DVD, or flash memory. A general-purpose memory, which may be removable or not, and may be volatile or not, can be configured into an embodiment using items such as quality parameter 202, 206-218 ratings 204, quality measurement code 226, rating criteria 232, and/or warning 236 actions 238 and triggers 240, in the form of data 118 and instructions 116, read from a removable medium 114 and/or another source such as a network connection, to form a configured medium. The configured medium 112 is capable of causing a computer system to perform process steps for transforming data through individual quality parameter measurements as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from Microsoft WindowsPhone8 Application Monitoring for Real Life and Application Ready for Real Life documentation (Microsoft® and Windows® are marks of Microsoft Corporation). Microsoft Windows 8 and Microsoft Windows Phone are products of Microsoft Corporation. Aspects of the Microsoft Windows 8 and Microsoft Windows Phone products and/or documentation are consistent with or otherwise illustrate aspects of the embodiments described herein. However, it will be understood that Microsoft Windows 8 and Microsoft Windows Phone documentation and/or implementation choices do not necessarily constrain the scope of such embodiments, and likewise that Microsoft Windows 8 and Microsoft Windows Phone and/or their documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

Real Life Scenarios

Portable devices tend to be with end users all the time; they are part of the end user's life. Mobile devices also often get used in bursts rather than one long usage. They get used in environments that desktop were not used in. Mobile device application usage is subject to other functions/interruptions that end users can deem important, such as incoming phone calls.

Some factors that developers may want to consider while building for these devices include the following.

Hardware Power. Though mobile devices are more powerful than they used to be, they are still much less powerful than a traditional desktop, in terms of CPU, memory or GPU. But expectations of end users in terms of user experience or responsiveness are not necessarily much less.

Variety. The same application might be run on a variety of different devices with varying CPU/Memory/GPU/peripherals.

Optional Peripherals. Although mobile device may have less computing power, it often has more peripherals. Many devices have touch screens, camera, compass, GPS, accelerometer, and/or proximity sensors. It may be a more personal device, in that it knows the end user's contacts, where the end user is located, who the end user is, and so on. The application may be accessible to a user whenever and wherever the user desires. Applications can create variety of user experiences that were difficult to obtain in a desktop world.

Battery. Desktops are connected and even for the best of the laptops the expectation around power consumption is not high. But for phones, battery life can be a very high priority, not merely because it is good to have more battery life, but because when your phone is dead you cannot receive or send phone calls on it—a primary function of the device fails.

Connectivity. These devices are (almost) always connected, but also differ from desktops in what connections can be made.

Reliability. Reliability of connections for a desktop or laptop will be higher than for a typical phone. These phones are with end users all the time, including in tunnels, the metro, and other places where network connections get dropped. Connection dropping is not considered a failure case but is rather part of real life. The end user expects it and applications are expected to handle it.

Speed. Speed of the connection can vary for the same device. A phone can be connected to 2G, 3G, Wi-Fi and/or other networks. Applications may be expected to behave differently depending on the speed of the network.

Money. Network usage translates into costs on an end user's bill. End users are conscious of relationships between data downloaded and their bills.

Phone interruptions. With a device that is part of an end user's daily life and heavily used, applications are subjected to many interruptions, more so than in a desktop environment. End users expect applications to handle interruptions gracefully, e.g., when a phone call or SMS comes in, when a telecommunications network connection drops, and when a GPS connection is lost.

User Experience. Since there is no mouse or large monitor on some devices, the user experience is tailored for touch. Applications are better when they use the limited real estate well, leveraging it with information appropriately. This implicates limitations such as buttons not being too close and text not being too small, but also gives users access to gestures which can express actions in natural ways such as a shake or pinch.

How can Developer Tools Help. Developer tool workflow for these devices, may have capabilities beyond the desktop environment. In addition to familiar capabilities such as compiling, debugging, profiling, some tools help developers build applications that are ready for real life by providing feedback about the factors an end user would care about rather than vague feedback in terms of a star rating.

Some tools provide capabilities such as the following: an ability to simulate a variety of real life conditions by combining factors such as device states, events, hardware configurations and usage scenarios; an ability to monitor/measure 412 and analyze various aspects of application/device behavior under such conditions and give a clear indication 328 of improvements 414 that will result in higher ratings 204 for the end user to eventually see; an ability to repeat such runs via record 416 and playback 418 automatically and predictably on a variety of hardware configurations/states/events. Such a development process can help give the developer the ability to build an application and validate it in the context of real life conditions. Some development processes are a fusion of such abilities, to help developers put applications through similar conditions to what they face on an end user's device.

As to hardware configurations 410, some embodiments simulate hardware configurations that, developers want to target, particularly for multiple chassis support and additional peripherals a device might have. As to device state emulation 404, some embodiments simulate real life states in which a device can be while an application runs, e.g., network conditions of varying speed/latency/reliability, low battery scenarios, and bright daylight. As to event simulation 408, some embodiments simulate ephemeral events that are applied to states 404, e.g., a phone call comes in or a network connection drops, or a device passcode lock engages, and so on. As to usage scenarios 406, some embodiments include usage cases that a developer expects users to run through, e.g., playing a level successfully for a game. As to record 416 and playback 418, some embodiments allow usage scenarios to be run repeatedly, with a variety of hardware/states/events. Some tools measure 412 the quality parameters 202 of an application objectively while such real life simulations/emulations are being done or while recording or playing back a usage scenario.

In some embodiments, tools help developers improve 414 applications based on specific criteria 232 and the behavior 402 of the application under various real life scenarios, and provide informative comparisons to other applications. Comparing a high end graphics game power usage to a stock application's power usage may not be helpful. But if high end graphics game developer can learn that power usage of the game is within the top 20% of other similar games, that information is more likely to help improve the game. Some embodiments help compare the application's quality with other similar applications and/or applications in the same marketplace category 230, and provide developers/end users data about where an application falls on the bell curve of such applications.

When a developer publishes the application on a marketplace, some embodiments provide a multi-parameter 202 rating system that integrates application behavior under objective criteria 232. A rating 204 publication may take into consideration parameters 202 for an application such as those discussed herein.

In some embodiments, example scenarios include the following. Pat is a mobile application developer and he has decided to build a book reader application. Pat opens a version of Microsoft's Visual Studio® IDE 140, 220 and creates a new Windows® Phone project (marks of Microsoft Corporation). At the time of creation he sees that he can choose a category 230 for the application (an optional field). Pat goes ahead and chooses the category "Books & Reference" from a drop-down list of categories, which will help optimize his development experience for reader type of applications. (Pat can optionally edit settings to customize the tools to suit his application).

Pat starts designing the application and he gets design time hints 328 to make his app user friendly in terms of readability under various themes, minimum sizes of controls, etc. Pat completes designing the application and writes code 122 for the application and starts building it. He gets build time warnings 236 that help him to catch issues that could affect the stability of the application (the IDE understands that stability is an important aspect of a reader application and proactively checks for issues at build time). Pat now debugs the application and makes sure that all the functionality is working as expected.

Pat runs the application on the device using Ctrl+F5/F5/Alt+F1 or any similar shortcut, and the quality measurement code 226 automatically analyses the application while Pat is using the application. Pat finds that he can also use an App dash board that shows default controls to trigger conditions like low power, which are important for a reader application. Pat simulates a low power condition and continues running his application. Pat finds that network effects (changing network speed and latency) get simulated automatically as network activity is detected. Pat notices that the application takes lot of time to download a book when the network effects simulation starts.

Once Pat is done running the application, the IDE shows him a set of specific warnings 236 related to response time, memory usage, power consumption, etc. Pat finds that the power consumption of his app is high even when the device is running low on battery. Pat clicks on the warning 236, which opens an information panel with detailed time line graphs for power consumption, and other data like start up time, resume time, response time, etc. Based on the above, Pat understands that his current way of downloading and his current power consumption pattern are not optimal for real life.

Pat now modifies his app to use less power consuming themes when the phone 102 is running in low battery mode so that the end users' reading experience is optimized for low battery condition. He also makes sure that he does network downloads in the background so that users can leave the application and do other productive things with the phone while a book is getting downloaded. Pat now runs his application again and finds that his application is more ready for real life. He is happy about the quality of his application and uploads it to a marketplace 424.

Later, Pat adds additional functionality to his code which affects some of his scenarios. Pat decides that he would like run the scenarios again and see if anything in the app's real life readiness has changed. He goes back to the IDE development environment 220 and selects the option to run a select set of recorded 416 scenarios. Alternatively, Pat can right click on a specific scenario script in a solution explorer and choose to run that. The application gets launched and the scenarios are run one after another on the device. When the runs are completed, Pat finds his overall app rating is 3/5 due to issues in app responsiveness under specific network conditions. Pat launches the profiler 136 and sees an option to profile a recorded scenario. He selects the appropriate script corresponding to the scenario and runs it under profiler. The profiler runs the scenario and identifies the issue. Pat now knows the cause of the problem and fixes it. He reruns the automated scenario under profiler and finds that the issue is fixed.

Pat now decides to publish the application to market place. He goes to a marketplace preparation test kit and selects a set of scenarios to be run and starts running marketplace pre-certification tests. All the marketplace tests pass and Pat goes ahead and posts the application to the marketplace.

Later, Pat launches a monitoring session, exercises a typical video watching activity, and gets an analysis report on an app 120. The report provides information 328 about the app's network utilization characteristics, and additional details to help improve it. Pat realizes that some websites allow an app to pull different resolutions from the website. The app is already pulling higher resolutions/formats when on Wi-Fi. With cellular however, there are various network types ("G", "E" and "H"). Even when pulling in a low resolution as 320×240 resolution, content may not play on an "E" network. Pat adds in network interface detection, and pulls the lowest resolution 176×144 content on such network types.

Pat is also developing a local search application. Pat has added different search categories in the app like Restaurants, Theatres, Hospitals, etc. Each search category has a list of options the user can choose from. For this Pat adds a list box 'Options List' and defines the item template for the list box. As Pat continues working on the app, a warning 236 indicates that the distance between the items in the list box 'Options List' does not meet the WP UI guidelines and it should be set to minimum of 12 points. Pat is glad this issue was pointed out at this point in the development cycle, and readily fixes it. Pat then continues with the app development and sets the background color of the detail page view of an option to match the accent color of the phone. Pat gets a warning indicating that the text will be less readable when user sets the accent color to a dark color and theme to light. Pat changes the accent color to Brown and sets the theme to light on the device, then deploys the app on the device and notices that the text is indeed less readable. Pat changes the background color logic to avoid this problem.

Pat's local search app is ready to build. The app has a feature where a user can click a pic and search for it. However, this is an optional feature and Pat has marked camera capability as optional. Upon building the application Pat gets a warning 236 that the no-camera exception is unhandled. Pat set camera capability as optional but forgot to handle the case when there is no camera available on the user's device. Pat adds a try/catch block to gracefully handle this situation. Pat then takes a look at the other list of warnings and decides to fix some but not all of them. Pat chooses the warnings to be fixed as per the application's context and desired functionality.

Some embodiments provide 340 a warning 236 that high energy consumption was detected between time t1 and t2, triggered 240 by overall energy consumption above a threshold value for a threshold duration. Some provide 340 the same warning 236 action 238 triggered 240 by display 142 energy above a threshold within the stated time period. Some embodiments provide 340 a warning 236 of x % radio energy overhead due to scatter-burst network traffic; consider batching network downloads, triggered 240 by duration of a cell radio tail power state higher than the its high power state. Some embodiments provide 340 a warning 236 of high CPU energy consumption detected between time t1 and t2; consider rerunning the scenario under profiling, triggered 240 by CPU energy above a threshold within the stated time period.

Some embodiments provide 340 a warning 236 that more than x KB of data was transferred; consider simulating this scenario over other network types, triggered 240 by data transfers above a threshold size within a threshold duration of time. Some embodiments provide 340 a warning 236 of peak data download rate of x Kbps detected; this is above <immediately slower network Interface type> capabilities, triggered 240 by data download rate above what can be sustained over a 2G/3G/4G/Wi-Fi network. Some embodiments provide 340 a warning 236 of peak data upload rate of x Kbps detected; this is above <immediately slower network Interface type> capabilities, triggered 240 by data upload rate above what can be sustained over a 2G/3G/4G/Wi-Fi network.

In some embodiments, app stability 218 testing 344 includes static analysis of the app 120 at build time to identify potential issues that could lead to app crashes. In some, network activity criteria 232 include validating code to see if network related code snippets have been handled properly by the developer, e.g., using bandwidth-aware APIs 124. In some, battery friendliness 210 testing 344 checks for usage of battery APIs that handle battery usage effectively. In some, criteria 232 include checking for correct handling of obscure events if the category 230 of the app is Games. In some embodiments, criteria 232 include checking at build time to test whether the app handles the possible exceptions, and app deactivated/closing events. Quality measurement code 226 may perform auto validation, including verifications done at build time.

In some embodiments, app responsiveness 212 monitoring provides a graph of the application responsiveness over a period of time, to help the developer figure out where app responsiveness dipped. Aided with page navigation demarcations and input event landmarks, the developer can further narrow down on which page and due to which input, the responsiveness dipped.

In the following examples of category 230 criteria 232, omitted criteria are merely optional in some embodiments, while in other embodiments omitted criteria are intentionally excluded as low/no priority items. Which criteria are omitted can be determined by comparing two or more categories' respective discussed criteria 232.

In some embodiments, a Games category 230 has one or more of the following assigned/associated criteria 232. Start up time tolerance is higher when compared to other categories. Resume should be instantaneous and the app should resume from where it left off. Power should last a long time, e.g., at least 8 hours. The app should be a good citizen in terms of memory consumption. Migration across cellular, Wi-Fi and DTPT networks is tested; increased speed is a low priority but gracefully handling latency and related failures such as packet loss is a high priority. Phone intrusions should be handled correctly by the game and the game should get paused with the state saved in case the UI gets obscured; resizing should happen when an event (like SMS) comes that covers a small portion of the screen. App responsiveness is a high priority. Portrait and landscape handling is a low priority but usually worth checking. Correct handling of gestures, back key, exceptions should be tested. Device independence is a priority, e.g., as to different form factors, optional hardware. Cost awareness is not significant as little data is exchanged. Stability should be high; games run for a long time. Location info is a low priority.

In some embodiments, a News category 230 has one or more of the following assigned/associated criteria 232. Medium start up time when compared to other categories. Resume should be instantaneous and the app should resume from where it left off. Power should be optimized for multiple startups for snacking apps and medium usage for news aggregation services. Responsiveness under low bandwidth, and readability, are high priorities. Bandwidth latency simulations are a priority, typically around signal strength fluctuations and occasional connectedness. Validating responsiveness around news sync is a priority. Correct handling of gestures, back key, exceptions should be tested. Device independence as to font size readability is a priority. Cost awareness is a high priority; suggest network cost profiling and sync pattern analysis. Stability should be moderate.

In some embodiments, a Travel category 230 has one or more of the following assigned/associated criteria 232. Startup should be on the quick category. Power profiling is important around startup. Resume should be instantaneous and app should resume from where it left off. Optimize power for startups. For travel reference, optimize for reader experience. Responsiveness under low bandwidth is important. Readability of text is important. Optimize for outdoor experience (colors, font size). Bandwidth latency simulations are important, typically around signal strength fluctuations and occasional connectedness. Responsiveness around sync is a priority. Correct handling of gestures, back key, exceptions should be tested. Readability, resource consumption are priorities (these apps can become a resource hog). Can potentially execute as background agents. Cost awareness is a high priority; suggest network cost profiling and sync pattern analysis. Stability should be moderate. Integration with phone can offer high value.

In some embodiments, an Entertainment category 230 has one or more of the following assigned/associated criteria 232. Resume should be instantaneous and app should resume from where it left off. Correct handling of gestures, back key, exceptions should be tested.

In some embodiments, a Music/Video category 230 has one or more of the following assigned/associated criteria 232. Snappy start up—low tolerance for start up time. Resume should be instantaneous and app should resume from where it left off. Longer power duration—important to consume less power (travel). Meeting UI guidelines for list selection, font size, etc. Should be network conscious, e.g., choosing right size image/video depending on network speed. As to phone intrusions, respond to notifications (fading in/out of music). Ability to play in screen locked mode. As to responsiveness, provide smooth streaming of videos, playing of music. Correct handling of gestures, back key, exceptions should be tested. Significant data transfer; should be network\cost aware. Radios/fm players should be location aware.

In some embodiments, a Productivity tool category 230 has one or more of the following assigned/associated criteria 232. Very fast start up, quick actions. Resume should be instantaneous and app should resume from where it left off. Short period power usage—burst of activities. Typically consume less network. Pings/configs stored. Avoid UI sluggishness. Correct handling of gestures, back key, exceptions should be tested. As to security, info is encrypted, does not allow other apps to get last typed input, uses secure connections. As to phone intrusions, link to reminders.

In some embodiments, a Lifestyle category 230 has one or more of the following assigned/associated criteria 232. Resume should be instantaneous and app should resume from where it left off. Bursts of network activities. Speed is a priority, as data size will typically be low. Correct handling of gestures, back key, exceptions should be tested. When purchasing, hand off to browser, remove cookies, store password. Provide notification when related social activities are present.

In some embodiments, a Kids & Family category 230 has one or more of the following assigned/associated criteria 232. Tolerance for start up time is low as typically these apps are less complex. Resume should be instantaneous but state is not very important. Power usage is not important as typically these apps are used for shorter durations. Should conform to UI guidelines. Memory usage is not very important as typically these apps are not very memory intensive. Network migration is not very important. Typically network speed is also not very important. There is not much state to worry about and is not very important. Avoid UI sluggishness. Landscape/portrait handling has medium importance as users can use app in one orientation. Correct handling of gestures, back key, exceptions should be tested. As to device independence, resolution is important and other factors are not very important. Network cost awareness is not significant for most of the apps and even for the ones that use data, the typical usage is less. As to stability, usage duration is short. Global readiness is important.

In some embodiments, a Weather category 230 has one or more of the following assigned/associated criteria 232. Start up tolerance is medium as there is a lot of visual content. Resume should be instantaneous and app should resume from where it left off. Power usage is not very important as these apps are typically used for a short duration. Should conform to UI guidelines. Should be a good citizen in terms of memory consumption. Lot of data (e.g., maps) are downloaded from the net hence speed is important, but migration is not very important. Phone interruptions are less important as there is not much state that needs to be saved. Avoid UI sluggishness. Landscape/portrait handling has medium importance as users can use app in one orientation. Correct handling of gestures, back key, exceptions should be tested. As to device independence, resolution is important. Network cost awareness is important. As to stability, usage duration is short. Location awareness is important as report is customized based on location, but simulating errors is not important.

In some embodiments, a Navigation category 230 has one or more of the following assigned/associated criteria 232. Start up tolerance is medium as there is a lot of visual content. Resume should be instantaneous and app should resume from where it left off. Power usage is important as the app is typically used for a long time. Should conform to UI guidelines. Should be a good citizen in terms of memory consumption. Lot of data (e.g., maps) is downloaded from the net hence speed is important, and migration across cellular networks (and the resultant difference in speed) is very important. Phone interruptions should be handled and there should not be loss of data. Avoid UI sluggishness. Landscape/portrait handling is important as users should be able to use app in both orientations. Correct handling of gestures, back key, exceptions should be tested. As to device independence, resolution is important. Network cost awareness is important. As to stability, usage duration is long so stability is very important. As to location, it is important to be able to work in spite of intermittent GPS errors.

In some embodiments, a Health category 230 has one or more of the following assigned/associated criteria 232. Start up time is not very significant. Resume time not very significant, but app should resume from where it left, should not lose data. Power conservation is important for long running apps such as exercise tracking apps. Network constraints will not have significant impact on the app. Phone Intrusion handling is low priority. Orientation handling is low priority. Correct handling of gestures, back key, exceptions should be tested. As to device independence, should be able to validate on different form factors, optional hardware. These apps may have region specific content. Network cost awareness is not very significant as the data exchanged is generally small. Stability is important for long running apps such as exercise tracking apps. Many apps use location info. Personal Information disclosure is a concern.

In some embodiments, a Photo category 230 has one or more of the following assigned/associated criteria 232. Resume time is not very significant, but app should resume from where it left, should not lose data. Power usage is an important consideration. Network speed may impact upload/download time. Latency may impact slideshow experience. Should react to orientation changes. Correct handling of gestures, back key, exceptions should be tested. Apps may have region specific content. Photo download/upload cost are important. App stability is important as app may be used for medium-long duration. Many of these apps use location info. Personal Information disclosure is a concern. Integration with Photo hub adds value.

In some embodiments, a Social category 230 has one or more of the following assigned/associated criteria 232. Start up should be quick. Resume time is not very significant, but app should resume from where it left, should not lose data. Power usage, network effects, and responsiveness are each an important consideration. Correct handling of gestures, back key, exceptions should be tested. Apps may have region specific content. Network access costs are important. App stability is important as app may be used for medium-long duration. Personal Information disclosure is a concern. Integration with People hub adds value.

In some embodiments, a Sports category 230 has one or more of the following assigned/associated criteria 232. Start up should be quick (low tolerance). Resume should be instantaneous and app should resume from where it left off. Power usage is not very important. Some tolerance to network glitches. After phone intrusion get back to the same state. Should handle both orientations. Correct handling of gestures, back key, exceptions should be tested. Apps may have region specific content. Network access costs have medium-low impact.

In some embodiments, a Finance category 230 has one or more of the following assigned/associated criteria 232. Medium tolerance for start up time—better to be secure than have a quick start up. Resume should be instantaneous and app should resume from where it left off. Power usage is not very important. High expectations around hit area; clarity in readability is important. Typically not used on the move, but very high expectations for no-packet-loss and secure transactions. Typically intrusions are not encouraged; get back to exact same transaction. Should handle both orientations. Correct handling of gestures, back key, exceptions should be tested. Different form factors are important; hardware differences may not matter. Uses localization, location/country/ regional settings awareness and logic. Network cost awareness is not very significant as the data exchanged is generally small. App stability should be very high, even if uses are short duration. Security is a very high priority.

In some embodiments, a Business category 230 has one or more of the following assigned/associated criteria 232. Start up should be very quick (low tolerance). Resume should be instantaneous and app should resume from where it left off. Power conservation is important—app may be used for a couple of hours at a time. Readability is important. Some tolerance to network glitches. After phone intrusion get back to the same state. Should handle both orientations. Correct handling of gestures, back key, exceptions should be tested. Apps may have region specific content. Network access costs have medium-low impact.

In some embodiments, a Books & Reference category 230 has one or more of the following assigned/associated criteria 232. Start up tolerance is low. Resume should be instantaneous and app should resume from where it left off. Power conservation is important for reader category as typically apps get used for a lot of time. Should conform to UI guidelines. Should be a good citizen in terms of memory consumption. Lots of data is downloaded hence speed is important, but migration is not very important. Phone interruptions should be handled so that the current state is not lost. Avoid UI sluggishness. Landscape/portrait handling is important as users should be able to use app in both orientations. Correct handling of gestures, back key, exceptions should be tested. As to device independence, resolution is important. Network cost awareness is important as lots of data gets exchanged. As to stability, usage duration is long so stability is very important.

Some embodiments provide an option at project creation to indicate the category(ies) 230 of app a developer plans to develop. For mobile apps, the list of categories 230 can include Games, Entertainment, Books, Lifestyle, Social Networking, and others. In each of these categories, the user expectations vary. For instance, for a social networking app the start up time is expected to be very small, because users are in a hurry to view updates or post something, whereas for a game having a slower start up is fine. Similarly, an Entertainment app asking for user data need not be very secure, but for a Finance app or Password Manager app, when the user data is taken it is expected to be very securely saved. So once the development environment 220 knows the category 230 of the app, the warning thresholds 240 and baselines can be appropriately set, e.g., with different start up time thresholds for a game than a social networking app.

As for design warnings 236, when the developer is working on designing an application, some embodiments provide get warnings pertaining to the usability of the app from a user experience perspective, based again on the app category 230. For example, for mobile apps if a color combination will not be visible in a light theme or in day time, a warning is given that the app is not theme aware. At design time, the warning could also appear on the designer surface itself next to a control that doesn't satisfy a UI guideline, in addition to appearing in a warnings tab. Similarly, if a control in the layout is too small to meet touch area requirements, a warning informs the developer to change the size of the layout so that it meets touch friendly requirements.

At build time, familiar mechanisms such as FxCop can be used to validate rules, but such are generic and fail to account for the app category 230 as taught herein. Rules specific to the app category can be applied. For example, after determining at build time that an app uses a network (e.g., through static analysis looking for network APIs and classes), some embodiments show a warning to the developer to use bandwidth aware APIs if they are not being used already. Similarly, if the app is a password manager, some embodiments show a warning to use the most secure encryption APIs if they are not already being used. Similar rules can be tailored to the application category and appropriately shown to the developers (using FxCop) at build time.

At run time, some embodiments again monitor the application to show to the developer indications 328 of app quality and where this app stands relative to the parameters 202 that impact end users. In some embodiments, this monitoring will take place in the regular workflows 348 of the developer, e.g., using familiar controls such as F5 and Control+F5; the developer does not launch a separate tool for the testing 344. Similarly, at design time the development environment 220 provides 340 appropriate quality warnings without the developer invoking any different tool to get those warnings. As part of the usual workflow, application quality is monitored in the background and the appropriate warnings are provided 340 then and there.

Some embodiments provide a software development process #1 for receiving multiple individual quality parameter ratings for a specific portable device application, the process including the steps of: configuring a hardware memory of a computing environment with the specific portable device application, the memory in operable communication with a development environment which includes quality measurement code executable by at least one processor of the computing environment; submitting to the development environment a request for the specific portable device application to undergo quality measurement by the quality measurement code; and receiving from the development environment individual quality parameter ratings for the specific portable device application for each of at least three of the following individual quality parameters: user experience, cost awareness, battery friendliness, responsiveness, global readiness, device independence, application stability.

Some embodiments provide a process #2, which is process #1 wherein the receiving step receives at least one individual quality parameter rating which varies according to an application category selected for the specific portable device application, and the process further comprises selecting an application category for the specific portable device application, the application category selected from a list of application categories displayed by the development environment, the list of application categories including at least four of the following application categories: Books, Business, Catalogs, Education, Email, Entertainment, Finance, Games, Health & Fitness, Lifestyle, Medical, Music, Navigation/Search, News, Password Manager, Photo & Video, Productivity, Reference, Social Networking, Sports, Travel, Utilities, Weather.

Some embodiments provide process #3, which is process #2, further including publishing the ratings in an application marketplace as part of an offering of the specific portable device application.

Some embodiments provide process #4, which is process #1, further including accepting an application category for the specific portable device application, the application category automatically selected and displayed by the development environment, the selected application category being in one of the following categories: Books, Business, Catalogs, Education, Email, Entertainment, Finance, Games, Health & Fitness, Lifestyle, Medical, Music, Navigation/Search, News, Password Manager, Photo & Video, Productivity, Reference, Social Networking, Sports, Travel, Utilities, Weather.

Some embodiments provide process #5, which is process #1, further including publishing at least two of the ratings in an application marketplace as part of an offering of the specific portable device application.

Some embodiments provide process #6, which is process #1, further including using the development environment to simulate conditions which combine device states, events, hardware configurations, and usage scenarios, and then receiving from the development environment individual quality parameter ratings for the specific portable device application based at least in part on the simulated conditions.

Some embodiments provide a computer-readable storage medium #7 configured with data and with instructions that when executed by at least one processor causes the processor(s) to perform a process for producing multiple individual quality parameter ratings for a specific portable device application, the process including the computational steps of: obtaining the specific portable device application in a memory; performing quality measurement of the specific portable device application; and producing individual quality parameter ratings for the specific portable device application for each of at least four of the following individual quality parameters: user experience, cost awareness, battery friendliness, responsiveness, global readiness, device independence, application stability.

Some embodiments provide configured medium #8, which is medium #7, wherein the process produces a user experience rating based on at least one of the following: adherence to published user interface guidelines, text readability, localization readiness, multiple hardware variants readiness, input friendliness.

Some embodiments provide configured medium #9, which is medium #7, wherein the process produces a cost awareness rating based at least in part on network usage.

Some embodiments provide configured medium #10, which is medium #7, wherein the process produces a battery friendliness rating based on at least one of the following: whether the battery lasts at least a predetermined length of time in a specified usage scenario, whether unused peripherals are powered, whether application program interfaces designated as power-hungry are avoided, whether darker color themes can be chosen over lighter colors, whether batching is used for network data communications, whether code execution algorithms are optimized, whether disk access (file i/o) operations are optimized Some embodiments provide configured medium #11, which is medium #7, wherein the process produces a responsiveness rating based on at least one of the following: start-up speed, resume speed, response time during game play, response time when an incoming text or phone call arrives, smoothness of streamed video, smoothness of music play, response to any user input.

Some embodiments provide configured medium #12, which is medium #7, wherein the process produces a global readiness rating based on at least one of the following: responsiveness in a low-bandwidth network, usability of the application in low-cost devices, readiness of the application for specified locales.

Some embodiments provide configured medium #13, which is medium #7, wherein the process produces a device independence rating based on at least one of the following: functionality with different central processing units; functionality with different amounts of memory; functionality with different graphical processing units; display resolutions, at least two of the following peripherals: gyro, camera, compass, accelerometer, global positioning system, proximity, light.

Some embodiments provide configured medium #14, which is medium #7, wherein the process produces an application stability rating based on at least one of the following: whether the application terminates gracefully; any unhandled exceptions during execution; adherence to platform application model artifacts; readiness to handle at least two of the following interruptions: incoming phone calls, reminder pop-ups, alarms, any notifications.

Some embodiments provide configured medium #15, which is medium #7, wherein the process produces ratings collectively based on at least six of the following simulated conditions: different device central processor units; different device graphical processor units; different device memory capacities; different device peripherals; telecommunications network connection dropping; global positioning system connection dropping; connection to 2G, 3G, 4G/LTE, and/or Wi-Fi networks; interruption by incoming phone call; interruption by incoming SMS; network latency; usage outdoors; network roaming; landscape/portrait mode changes; switching between applications; power off/on; different display resolutions.

Some embodiments provide a computer system #16 including a logical processor; a memory in operable communication with the logical processor; a portable device application residing in the memory and having an application category; and quality measurement code residing in the memory, which upon execution by the processor produces from the portable device application and its application category individual ratings for each of at least three of the following individual quality parameters: user experience, cost awareness, battery friendliness, responsiveness, global readiness, device independence, application stability.

Some embodiments provide computer system #17, which is system #16, wherein the quality measurement code produces the ratings based on simulation of device states, events, hardware configurations, and usage scenarios.

Some embodiments provide computer system #18, which is system #16, wherein the quality measurement code produces at least three of the following ratings based at least in part on the stated rating criteria: a user experience rating based on at least two of the following rating criteria: adherence to published user interface guidelines, text readability, localization readiness, multiple hardware variants readiness, input friendliness; a battery friendliness rating based on at least two of the following rating criteria: whether the battery lasts at least a predetermined length of time in a specified usage scenario, whether unused peripherals are powered, whether application program interfaces designated as power-hungry are avoided, whether darker color themes can be chosen over lighter colors, whether batching is used for network data communications; a responsiveness rating based on at least two of the following rating criteria: start-up speed, resume speed, response time during game play, response time when an incoming text or phone call arrives, smoothness of streamed video, smoothness of music play, response to any user input; a global readiness rating based on at least two of the following rating criteria: responsiveness in a low-bandwidth network, usability of the application in low-cost devices, readiness of the application for specified locales; a device independence rating based on at least two of the following rating criteria: functionality with different central processing units; functionality with different amounts of memory; functionality with different graphical processing units; display resolutions, at least two of the following peripherals: gyro, camera, compass, accelerometer, global positioning system, proximity, light; an application stability rating based on at least two of the following rating criteria: whether the application terminates gracefully; any unhandled exceptions during execution; adherence to platform application model artifacts; readiness to handle at least two of the following interruptions: incoming phone calls, reminder pop-ups, alarms.

Some embodiments provide computer system #19, which is system #16, wherein the quality measurement code produces ratings collectively based on at least eight of the following simulated conditions: different device central processor units; different device graphical processor units; different device memory capacities; different device peripherals; telecommunications network connection dropping; global positioning system connection dropping; connection to 2G, 3G, 4G/LTE, and/or Wi-Fi networks; interruption by incoming phone call; interruption by incoming SMS; network latency; usage outdoors; network roaming; landscape/portrait mode changes; switching between applications; power off/on; different display resolutions.

Some embodiments provide computer system #20, which is system #16, wherein the quality measurement code displays rating criteria and indicates improvements that will provide higher ratings.

Some embodiments provide process #21 for use by a developer during development of a portable device application, the process including the steps of: learning that a development environment will provide different warnings during development of the application, the warnings based at least in part on which application category the application is in; creating a development project for the portable device application in the development environment; and ratifying an application category selection for the portable device application in the development project, the application category selected from a list of application categories displayed by the development environment, the list of application categories including at least three of the following application categories: Books, Business, Catalogs, Education, Email, Entertainment, Finance, Games, Health & Fitness, Lifestyle, Medical, Music, Navigation/Search, News, Password Manager, Photo & Video, Productivity, Reference, Social Networking, Sports, Travel, Utilities, Weather.

Some embodiments provide process #22, which is process #21, wherein at least one of the following events occurs: the application category is Social Networking, and the developer receives a warning from the development environment that the application has a start-up time greater than desired for Social Networking applications; the application category is Password Manager or Finance, and the developer receives a warning from the development environment that the application should use a more secure approach to store user data than the approach being used in the project; the application category is News or Photo & Video, and the developer receives a warning from the development environment that the application should request several photos at a time instead of requesting them one at a time with delays in between the requests; the application category is Email, Photo & Video, News, or Social Networking and the developer receives at least one of the following warnings from the development environment about choosing an image resolution: the application should try to detect what kind of network is available, the application should try to detect what video resolutions are available, the application should consider the network bandwidth, the application should consider the user's data plan costs; the application category is Photo & Video and the developer receives a warning from the development environment that the application should detect whether a camera is available on the device running the application; the application category is Navigation/Search and the developer receives a warning from the development environment that the application should use power efficient APIs to resolve location; the application category is Weather and the developer receives a warning from the development environment that the application should take care of width and/or height of controls to accommodate content in various locales; the application category is News and the developer receives a warning from the development environment that the application should ensure that all controls meet minimum dimension requirements stated in user interface guidelines; the application category is News and the developer receives a warning from the development environment that the application content is not easily readable when a user switches to a light theme setting on the device; the application category is Games and the developer receives a warning from the development environment that the application should adhere to platform application model guidelines for back-key handling.

Some embodiments provide process #23, which is process #22, wherein at least two of the events occur.

Some embodiments provide process #24, which is process #22, wherein at least four of the events occur.

Some embodiments provide process #25, which is process #22, wherein at least six of the events occur.

Some embodiments provide a computer-readable storage medium #26 configured with data and with instructions that when executed by at least one processor causes the processor(s) to perform a process to assist development of an application, the process including the computational steps of: indicating that a development environment will provide different warnings during development of the application, including indicating that the warnings are based at least in part on which application category the application is in; setting an application category for the application, the application category including at least one of the following application categories: Books, Business, Catalogs, Education, Email, Entertainment, Finance, Games, Health & Fitness, Lifestyle, Medical, Music, Navigation/Search, News, Password Manager, Photo & Video, Productivity, Reference, Social Networking, Sports, Travel, Utilities, Weather; and providing a warning during development of the application, the warning based on the application category and/or on automatically obtained information about the application.

Some embodiments provide configured medium #27, which is medium #26, wherein the process comprises proactively setting the application category for the application in response to at least one of the following: a name of the application, a library that the application includes, an application program interface that the application uses.

Some embodiments provide configured medium #28, which is medium #26, wherein the process comprises assigning a set of warnings based on one or more application categories set for the application, wherein each warning has a trigger threshold and a warning action, and different application categories have different warnings, namely, they have different trigger thresholds for the same warning action and/or different warning actions.

Some embodiments provide configured medium #29, which is medium #28, wherein the process assigns at least one of the following warning sets: a Social Networking category warning and a Games category warning each have an action to warn a developer that an application's startup time should be shorter than a trigger threshold, and the Social Networking category warning has a smaller trigger threshold than the Games category warning; an Entertainment category warning and a Finance category warning each have an action to warn a developer that an application should use at least a trigger threshold level of security to store user data, and the Finance category warning has a more secure trigger threshold than the Entertainment category warning; a Password Manager category warning has an action to warn a developer that an application should use at least a trigger threshold level of security to store user data, and at least one other application category warning has the same warning action but a less secure trigger threshold; a Finance category warning has an action to warn a developer that an application should use at least a trigger threshold level of security to store user data, and at least one other application category warning has the same warning action but a less secure trigger threshold; a News category warning has an action to warn a developer that an application should request at least a trigger threshold number of photos at a time instead of requesting them less than that number at a time; a Photo & Video category warning has an action to warn a developer that an application should request at least a trigger threshold number of photos at a time instead of requesting them less than that number at a time; a Navigation/Search category warning has an action to warn a developer that an application should use power efficient APIs to resolve location, and the trigger threshold is an estimated power consumption; a Weather category warning has an action to warn a developer that an application should accommodate content in various locales, and the trigger threshold is a user interface control dimension; a News category warning has an action to warn a developer that an application should accommodate content in various locales, and the trigger threshold is a minimum dimension stated in a user interface guideline.

Some embodiments provide configured medium #30, which is medium #29, wherein the process assigns at least three of the warning sets.

Some embodiments provide configured medium #31, which is medium #29, wherein the process assigns at least five of the warning sets.

Some embodiments provide configured medium #32, which is medium #26, wherein the application is a mobile platform application, and the process provides at least one of the following warnings: a warning that the application will use a color combination that is difficult to read in daylight or in a light theme; a warning that the application will use a control layout that does not meet touch area requirements.

Some embodiments provide configured medium #33, which is medium #26, wherein the application is a networked application, and the process provides at least one of the following warnings: a warning that the application is not using bandwidth-aware APIs and should use those APIs; a warning that the application could be better at handling network connection dropping; a warning that the application could be better at choosing connections different types of networks; a warning that the application could be better at handling network latency; a warning that the application could be better at network roaming; a warning that the application could be better at cost awareness to avoid bill shock to end-users.

Some embodiments provide configured medium #34, which is medium #26, wherein the development environment proactively tests for trigger conditions and proactively provides triggered warnings within a workflow that includes application code editing, application building, and application running.

Some embodiments provide a computer system #35 including: a logical processor; a memory in operable communication with the logical processor; an application residing in the memory and having an application category which includes at least one of the following application categories: Books, Business, Catalogs, Education, Email, Entertainment, Finance, Games, Health & Fitness, Lifestyle, Medical, Music, Navigation/Search, News, Password Manager, Photo & Video, Productivity, Reference, Social Networking, Sports, Travel, Utilities, Weather; and development environment code residing in the memory, which upon execution by the processor provides different warnings during development of the application, the warnings based at least in part on which application category the application is in.

Some embodiments provide computer system #36, which is system #35, wherein the development environment code provides at least three of the following application-category-based warnings: the application category is Social Networking, and the development environment code provides a warning that the application has a start-up time greater than desired for Social Networking applications; the application category is Password Manager, and the development environment code provides a warning that the application should use a more secure approach to store user data than the approach being used in the project; the application category is Finance, and the development environment code provides a warning that the application should use a more secure approach to store user data than the approach being used in the project; the application category is News, and the development environment code provides a warning that the application should request several photos at a time instead of requesting them one at a time with delays in between the requests; the application category is Photo & Video, and the development environment code provides a warning that the application should request several photos at a time instead of requesting them one at a time with delays in between the requests; the application category is Email and the development environment code provides at least one of the following warnings about choosing an image resolution: the application should try to detect what kind of network is available, the application should try to detect what video resolutions are available, the application should consider the network bandwidth, the application should consider the user's data plan costs; the application category is Photo & Video and the development environment code provides at least one of the following warnings about choosing an image resolution: the application should try to detect what kind of network is available, the application should try to detect what video resolutions are available, the application should consider the network bandwidth, the application should consider the user's data plan costs; the application category is News and the development environment code provides at least one of the following warnings about choosing an image resolution: the application should try to detect what kind of network is available, the application should try to detect what video resolutions are available, the application should consider the network bandwidth, the application should consider the user's data plan costs; the application category is Social Networking and the development environment code provides at least one of the following warnings about choosing an image resolution: the application should try to detect what kind of network is available, the application should try to detect what video resolutions are available, the application should consider the network bandwidth, the application should consider the user's data plan costs; the application category is Photo & Video and the development environment code provides a warning that the application should detect whether a camera is available on the device running the application; the application category is Navigation/Search and the development environment code provides a warning that the application should use power efficient APIs to resolve location; the application category is Weather and the development environment code provides a warning that the application should take care of width and/or height of controls to accommodate content in various locales; the application category is News and the development environment code provides a warning that the application should ensure that all controls meet minimum dimension requirements stated in user interface guidelines; the application category is News and the development environment code provides a warning that the application content is not easily readable when a user switches to a light theme setting on the device; the application category is Games and the development environment code provides a warning that the application should adhere to platform application model guidelines for back-key handling; the application category is Games and the development environment code provides a warning that the application should adhere to platform application model guidelines for exception handling.

Some embodiments provide computer system #37, which is system #36, wherein the development environment code provides at least six of the application-category-based warnings.

Some embodiments provide computer system #38, which is system #36, wherein the development environment code provides at least nine of the application-category-based warnings.

Some embodiments provide computer system #39, which is system #35, wherein the application is a mobile platform application, and the development environment code provides at least one of the following warnings: a warning that the application will use a color combination that is difficult to read in daylight or in a light theme; a warning that the application will use a control layout that does not meet touch area requirements.

Some embodiments provide computer system #40, which is system #35, wherein the application is a networked application, and the development environment code provides at least three of the following warnings: a warning that the application is not using bandwidth-aware APIs and should use those APIs; a warning that the application could be better at handling network connection dropping; a warning that the application could be better at choosing connections different types of networks; a warning that the application could be better at handling network latency; a warning that the application could be better at usage outdoors; a warning that the application could be better at network roaming; a warning that the application could be better at cost awareness to avoid bill shock to end-users.

In some embodiments, a development environment simulates conditions combining device states, events, hardware configurations, and usage scenarios, and applies specific rating criteria to arrive at individual quality parameter ratings. Ratings are provided for quality parameters such as user experience, cost awareness, battery friendliness, responsiveness, global readiness, device independence, application stability. For example, battery friendliness depends on criteria such as battery life in a specified usage scenario, whether unused peripherals are powered, whether application program interfaces designated as power-hungry are avoided, whether darker color themes can be chosen over lighter colors, and whether batching is used for network data communications. Some rating criteria are application-category-specific. For example, security is rated differently for a Finance application than a Music application. The development environment provides specific warnings to indicate ways in which portable device applications and other applications can improve the ratings they receive. Ratings can be published in an application marketplace.

In some embodiments, a development environment provides warnings based on one or more application categories set for an application. Each warning has a trigger threshold and a warning action. Different application categories have different warnings. The development environment proactively tests for trigger conditions and provides triggered warnings within a workflow that includes application designing, code editing, building, and running. For instance, a Social Networking application whose start-up time is greater than desired for Social Networking applications will trigger a warning. Password Manager or Finance applications that should use a more secure approach to store user data will trigger a warning not given to applications in other categories. A News application may trigger a warning from the development environment that application content is not easily readable if a user switches to a light color theme on a device. The application category is selected by the developer or set proactively by the development environment.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A process for testing for trigger conditions and providing warnings or suggestions during the development of a portable device application, the process comprising the steps of:
   receiving a portable device application;
   displaying, by a development environment, a list of application categories, the list of application categories including at least three of the following application categories: Books, Business, Catalogs, Education, Email, Entertainment, Finance, Games, Health & Fitness, Lifestyle, Medical, Music, Navigation/Search, News, Password Manager, Photo & Video, Productivity, Reference, Social Networking, Sports, Travel, Utilities, Weather;
   receiving a user selected application category for the portable device application in the development environment, the application category selected from said list of application categories;
   determining a testing procedure for the portable device application based on the selected application category;
   testing the portable device application based on the determined testing procedure and providing warnings or suggestions based on the testing, wherein the process further comprises issuing a warning or suggestion consistent with at least one of the following conditions:
   if the application category is Social Networking, testing for compliance with start-up time requirements, and if noncompliant, issuing a warning from the development environment indicating that the application has a start-up time exceeding a trigger threshold for Social Networking applications;
   if the application category is Password Manager or Finance, testing for compliance with one or more security policies, and if noncompliant, issuing a warning from the development environment indicating that the application should adhere to security policies associated with Password Manager or Finance application categories;
   if the application category is News or Photo & Video, testing for compliance with policies regarding delays between photo requests, and if noncompliant, issuing a warning from the development environment indicating that the application should request several photos simultaneously instead of requesting them one at a time with delays in between the requests;
   if the application category is Email, Photo & Video, News, or Social Networking, testing for compliance with image resolution requirements, and if noncompliant, issuing at least one of the following warnings from the development environment: the application should try to detect what kind of network is available, the application should try to detect what video resolutions are available, the application should consider the network bandwidth, or the application should consider the user's data plan costs;
   if the application category is Photo & Video, testing whether the application determines whether a camera is available and if it does not, issuing a warning from the development environment indicating that the application should detect whether a camera is available on the device running the application;
   if the application category is Navigation/Search, testing whether the application determines whether the application uses power efficient APIs to resolve location and if it does not, issuing a warning from the development environment that the application should use power efficient APIs to resolve location;
   if the application category is Weather, testing for compliance with width and/or height controls, and if noncompliant, issuing a warning from the development environment indicating that the application should adhere to width and/or height of controls to accommodate content in various locales;
   if the application category is News, testing for compliance with minimum dimension requirements stated in user interface guidelines, and if noncompliant, issuing a warning from the development environment that the application should ensure that all controls meet minimum dimension requirements stated in user interface guidelines;
   if the application category is News, testing for compliance with color combination requirements, and if noncompliant, issuing a suggestion or warning from the development environment indicating that the application content use a different color combination;
   if the application category is Games, testing for compliance with back-key handling requirements, and if noncompliant, issuing a warning from the development environment indicating that the application should adhere to platform application model guidelines for back-key handling.

2. The process of claim 1, wherein the process comprises issuing warnings and/or suggestions consistent with at least two of the conditions.

3. The process of claim 1, wherein the process comprises issuing warnings and/or suggestions consistent with at least three of the conditions.

4. The process of claim 1, wherein the process comprises issuing warnings and/or suggestions consistent with at least five of the conditions.

5. The process of claim 1, wherein the process comprises issuing warnings and/or suggestions consistent with at least seven of the conditions.

6. The process of claim 1, wherein the process further comprises issuing at least one of the following:
   a suggestion that the application use a different color combination in daylight;
   a suggestion that the application use a different color combination in a light theme;
   a warning that the application uses a control layout that does not comply with a touch area requirement.

7. The process of claim 1, wherein the process further comprises issuing at least one of the following:
   a warning that the application is not using a bandwidth-aware API;
   a warning that the application does not comply with a network connection dropping guideline;
   a warning that the application does not comply with a guideline on choosing connections with different types of networks;
   a warning that the application does not comply with a guideline on handling network latency;
   a warning that the application does not comply with a guideline on network roaming;

a warning that the application does not comply with a guideline on cost to end-users.

8. A computer-readable memory configured with data and with instructions that when executed by at least one processor causes the processor(s) to perform a process comprising the computational steps of:
receiving a portable device application;
displaying, by a development environment, a list of application categories, the list of application categories including at least three of the following application categories: Books, Business, Catalogs, Education, Email, Entertainment, Finance, Games, Health & Fitness, Lifestyle, Medical, Music, Navigation/Search, News, Password Manager, Photo & Video, Productivity, Reference, Social Networking, Sports, Travel, Utilities, Weather;
receiving a user selected application category for the portable device application in the development environment, the application category selected from said list of application categories;
determining a testing procedure for the portable device application based on the selected application category;
testing the portable device application based on the determined testing procedure and providing warnings or suggestions based on the testing, wherein the process further comprises issuing a warning or suggestion consistent with at least one of the following conditions:
if the application category is Social Networking, testing for compliance with start-up time requirements, and if noncompliant, issuing a warning from the development environment indicating that the application has a start-up time exceeding a trigger threshold for Social Networking applications;
if the application category is Password Manager or Finance, testing for compliance with one or more security policies, and if noncompliant, issuing a warning from the development environment indicating that the application should adhere to security policies associated with Password Manager or Finance application categories;
if the application category is News or Photo & Video, testing for compliance with policies regarding delays between photo requests, and if noncompliant, issuing a warning from the development environment indicating that the application should request several photos simultaneously instead of requesting them one at a time with delays in between the requests;
if the application category is Email, Photo & Video, News, or Social Networking, testing for compliance with image resolution requirements, and if noncompliant, issuing at least one of the following warnings from the development environment: the application should try to detect what kind of network is available, the application should try to detect what video resolutions are available, the application should consider the network bandwidth, or the application should consider the user's data plan costs;
if the application category is Photo & Video, testing whether the application determines whether a camera is available and if it does not, issuing a warning from the development environment indicating that the application should detect whether a camera is available on the device running the application;
if the application category is Navigation/Search, testing whether the application determines whether the application uses power efficient APIs to resolve location and if it does not, issuing a warning from the development environment that the application should use power efficient APIs to resolve location;
if the application category is Weather, testing for compliance with width and/or height controls, and if noncompliant, issuing a warning from the development environment indicating that the application should adhere to width and/or height of controls to accommodate content in various locales;
if the application category is News, testing for compliance with minimum dimension requirements stated in user interface guidelines, and if noncompliant, issuing a warning from the development environment that the application should ensure that all controls meet minimum dimension requirements stated in user interface guidelines;
if the application category is News, testing for compliance with color combination requirements, and if noncompliant, issuing a suggestion or warning from the development environment indicating that the application content use a different color combination;
if the application category is Games, testing for compliance with back-key handling requirements, and if noncompliant, issuing a warning from the development environment indicating that the application should adhere to platform application model guidelines for back-key handling.

9. The computer-readable memory of claim 8, wherein the process comprises issuing warnings and/or suggestions consistent with at least two of the conditions.

10. The computer-readable memory of claim 8, wherein the process comprises issuing warnings and/or suggestions consistent with at least three of the conditions.

11. The computer-readable memory of claim 8, wherein the process comprises issuing warnings and/or suggestions consistent with at least four of the conditions.

12. The computer-readable memory of claim 8, wherein the process comprises issuing warnings and/or suggestions consistent with at least six of the conditions.

13. The computer-readable memory of claim 8, wherein the process further comprises issuing at least one of the following additional warnings:
a warning that the application is not using a bandwidth-aware API;
a warning that the application does not comply with a network connection dropping guideline;
a warning that the application does not comply with a guideline on choosing connections with different types of networks;
a warning that the application does not comply with a guideline on handling network latency;
a warning that the application does not comply with a guideline on network roaming;
a warning that the application does not comply with a guideline on cost to end-users.

14. The computer-readable memory of claim 13, wherein the process comprises issuing at least two of the additional warnings.

15. The computer-readable memory of claim 13, wherein the process comprises issuing at least three of the additional warnings.

16. A computer system comprising:
a processor;
a memory in operable communication with the processor;
a portable device application residing in the memory;
development environment code residing in the memory, which upon execution by the processor performs a process including the computational steps of:

displaying a list of application categories, the list of application categories including at least three of the following application categories: Books, Business, Catalogs, Education, Email, Entertainment, Finance, Games, Health & Fitness, Lifestyle, Medical, Music, Navigation/Search, News, Password Manager, Photo & Video, Productivity, Reference, Social Networking, Sports, Travel, Utilities, Weather;

receiving a user selected application category for the portable device application in the development environment, the application category selected from said list of application categories;

determining a testing procedure for the portable device application based on the selected application category;

testing the portable device application based on the determined testing procedure and providing warnings or suggestions based on the testing, wherein the process further comprises issuing a warning or suggestion consistent with at least one of the following conditions:

if the application category is Social Networking, testing for compliance with start-up time requirements, and if noncompliant, issuing a warning from the development environment indicating that the application has a start-up time exceeding a trigger threshold for Social Networking applications;

if the application category is Password Manager or Finance, testing for compliance with one or more security policies, and if noncompliant, issuing a warning from the development environment indicating that the application should adhere to security policies associated with Password Manager or Finance application categories;

if the application category is News or Photo & Video, testing for compliance with policies regarding delays between photo requests, and if noncompliant, issuing a warning from the development environment indicating that the application should request several photos simultaneously instead of requesting them one at a time with delays in between the requests;

if the application category is Email, Photo & Video, News, or Social Networking, testing for compliance with image resolution requirements, and if noncompliant, issuing at least one of the following warnings from the development environment: the application should try to detect what kind of network is available, the application should try to detect what video resolutions are available, the application should consider the network bandwidth, or the application should consider the user's data plan costs;

if the application category is Photo & Video, testing whether the application determines whether a camera is available and if it does not, issuing a warning from the development environment indicating that the application should detect whether a camera is available on the device running the application;

if the application category is Navigation/Search, testing whether the application determines whether the application uses power efficient APIs to resolve location and if it does not, issuing a warning from the development environment that the application should use power efficient APIs to resolve location;

if the application category is Weather, testing for compliance with width and/or height controls, and if noncompliant, issuing a warning from the development environment indicating that the application should adhere to width and/or height of controls to accommodate content in various locales;

if the application category is News, testing for compliance with minimum dimension requirements stated in user interface guidelines, and if noncompliant, issuing a warning from the development environment that the application should ensure that all controls meet minimum dimension requirements stated in user interface guidelines;

if the application category is News, testing for compliance with color combination requirements, and if noncompliant, issuing a suggestion or warning from the development environment indicating that the application content use a different color combination;

if the application category is Games, testing for compliance with back-key handling requirements, and if noncompliant, issuing a warning from the development environment indicating that the application should adhere to platform application model guidelines for back-key handling.

17. The system of claim 16, wherein the process performed by the development environment code includes issuing warnings and/or suggestions consistent with at least three of the conditions.

18. The system of claim 16, wherein the process performed by the development environment code includes issuing warnings and/or suggestions consistent with at least six of the conditions.

19. The system of claim 16, wherein the process performed by the development environment code further includes issuing at least four of the following additional warnings:

a warning that the application is not using a bandwidth-aware API;

a warning that the application does not comply with a network connection dropping guideline;

a warning that the application does not comply with a guideline on choosing connections with different types of networks;

a warning that the application does not comply with a guideline on handling network latency;

a warning that the application does not comply with a guideline on network roaming;

a warning that the application does not comply with a guideline on cost to end-users;

a warning that the application does not comply with a guideline on outdoor usage;

a warning that the application uses a control layout that does not comply with a touch area requirement.

20. The system of claim 16, wherein the process performed by the development environment code includes issuing at least five of the additional warnings.

* * * * *